United States Patent
Gray et al.

(10) Patent No.: US 10,526,817 B2
(45) Date of Patent: Jan. 7, 2020

(54) DISABLING SYSTEM FOR A LOCK ROD IN A VEHICLE DOOR'S LOCKING SYSTEM

(71) Applicant: Toyota Motor Engineering & Manufacturing North America, Inc., Erlanger, KY (US)

(72) Inventors: John K. Gray, Saline, MI (US); James D. Cunningham, Clarkston, MI (US); Yoshiki Ishikawa, Ann Arbor, MI (US); Tarakorn Soonthornwinate, Ann Arbor, MI (US); Josh David Fraley, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 46 days.

(21) Appl. No.: 15/804,447

(22) Filed: Nov. 6, 2017

(65) Prior Publication Data

US 2019/0136583 A1  May 9, 2019

(51) Int. Cl.
| | | |
|---|---|---|
| *E06B 3/00* | (2006.01) | |
| *E05B 77/04* | (2014.01) | |
| *E05B 79/16* | (2014.01) | |
| *E05B 83/40* | (2014.01) | |
| *B60J 5/06* | (2006.01) | |
| *B60J 5/04* | (2006.01) | |

(52) U.S. Cl.
CPC .............. *E05B 77/04* (2013.01); *E05B 79/16* (2013.01); *E05B 83/40* (2013.01); *B60J 5/0425* (2013.01); *B60J 5/06* (2013.01)

(58) Field of Classification Search
CPC .......... E05B 77/04; E05B 83/40; E05B 79/16; B60J 5/0425; B60J 5/06
USPC ........................................ 49/503; 296/146.6
See application file for complete search history.

(56) References Cited

U.S. PATENT DOCUMENTS

| | | | | |
|---|---|---|---|---|
| 5,253,906 A | * | 10/1993 | Rogers, Jr. .............. | E05B 77/12 292/216 |
| 5,584,516 A | * | 12/1996 | Cetnar .................... | E05B 77/12 292/336.3 |
| 5,709,498 A | * | 1/1998 | Sova ....................... | E05B 79/12 403/163 |
| 5,749,600 A | | 5/1998 | Yamada et al. | |
| 5,934,817 A | * | 8/1999 | Kim ........................ | E05B 79/12 292/336.3 |

(Continued)

*Primary Examiner* — Jerry E Redman
(74) *Attorney, Agent, or Firm* — Christopher G. Darrow; Darrow Mustafa PC (57) ABSTRACT

A vehicle includes a door with an interior door cavity, as well as a lock rod and another item of a locking system, an impact beam, an attack member and a push member, all housed in the interior door cavity. The impact beam crosses the other item from laterally between the other item and the door. The attack member faces the lock rod from laterally between the door and the lock rod. The push member, along the impact beam, faces the other item from laterally between the other item and the door and laterally beyond the impact beam. When the door collapses when compromised by a side impact event, the door carries the attack member for attacking action on the lock rod. The door additionally carries the push member for counterpart pushing action on the other item. A connection between the lock rod and the other item thus breaks.

19 Claims, 6 Drawing Sheets

(56) References Cited

U.S. PATENT DOCUMENTS

| | | | | |
|---|---|---|---|---|
| 6,042,159 | A * | 3/2000 | Spitzley | E05B 77/06 16/111.1 |
| 6,205,714 | B1 * | 3/2001 | Staser | B60J 5/0416 296/146.6 |
| 8,701,817 | B2 * | 4/2014 | Schoen | E05B 77/04 180/281 |
| 9,593,512 | B2 * | 3/2017 | Rosales | E05B 77/12 |
| 9,677,303 | B2 * | 6/2017 | Hirosawa | E05B 79/12 |
| 2004/0251693 | A1 * | 12/2004 | Schoen | E05B 77/06 292/1 |
| 2007/0013206 | A1 | 1/2007 | Huttsell et al. | |
| 2007/0029835 | A1 * | 2/2007 | Herline | E05B 77/04 296/146.1 |
| 2007/0069525 | A1 * | 3/2007 | Ghannam | E05B 77/04 292/216 |
| 2010/0019512 | A1 * | 1/2010 | Gschweng | E05B 53/00 292/217 |
| 2010/0109350 | A1 * | 5/2010 | Gschweng | E05B 17/0062 292/196 |
| 2011/0062747 | A1 * | 3/2011 | Teramoto | E05B 77/04 296/146.1 |
| 2011/0115251 | A1 * | 5/2011 | Jordan | E05B 77/02 296/146.1 |
| 2011/0115252 | A1 * | 5/2011 | Higgins | E05B 77/04 296/146.1 |
| 2011/0258935 | A1 * | 10/2011 | Heller | B60J 5/0451 49/502 |
| 2011/0271721 | A1 | 11/2011 | Muramatsu | |
| 2012/0036785 | A1 * | 2/2012 | Bedekar | E05B 77/04 49/394 |
| 2012/0119519 | A1 | 5/2012 | Sakai et al. | |
| 2013/0074413 | A1 * | 3/2013 | Moriya | B60J 5/0425 49/394 |
| 2015/0069764 | A1 | 3/2015 | Kerr, III | |
| 2016/0244100 | A1 * | 8/2016 | Hasegawa | B60J 5/0451 |
| 2017/0313166 | A1 * | 11/2017 | Sugie | B60J 5/0429 |

\* cited by examiner

REAR ← → FRONT

DISABLING SYSTEM FOR A LOCK ROD IN A VEHICLE DOOR'S LOCKING SYSTEM

TECHNICAL FIELD

The embodiments disclosed herein relate to the doors of passenger vehicles and, more particularly, to the locking systems used for closing the doors, locking and unlocking the doors, and opening the doors.

BACKGROUND

The typical passenger vehicle includes one or more doors. Each door serves as a closure panel for the vehicle's passenger compartment, and moves between a closed position and an open position. In addition to the doors, the vehicle includes a locking system for each door. The locking system for a given door has a closing subsystem, whose components serve to close the door, and an opening subsystem, whose components serve to lock and unlock the door, as well as to open the door.

The closing subsystem is often embodied by one or more latch assemblies that each include a latch. The opening subsystem, on the other hand, is often embodied by one or more handle assemblies that each include a user-accessible handle, as well as a linkage connected between each handle and all of the latches. As the door is moved to the closed position, each latch is moved to a latched position to thus close the door. When the opening subsystem is deactivated, the linkage is unresponsive to the operation of any of the handles to actuate any of the latches, thus locking the door. When the opening subsystem is activated, the linkage is responsive to the operation of any of the handles to actuate all of the latches, thus unlocking the door, and raising the prospect of allowing the door to open.

Once operation of the vehicle is underway, the door is meant to remain closed. In normal operation of the vehicle, the opening subsystem functions to keep the door closed. However, as opposed to its functioning in normal operation of the vehicle, the opening subsystem is sometimes subject to functional disruption with respect to keeping the door closed when the door is compromised by a side impact event.

SUMMARY

Disclosed herein are embodiments of doors for vehicles that house locking systems with lock rods in the same space as impact beams, vehicles with these doors, and aspects of using components of disabling systems for the lock rods to break the connection between the lock rods and other items of the locking systems.

In one aspect, a vehicle includes a door with an interior door cavity, a lock rod and another item housed in the interior door cavity as part of a locking system for the door, and an impact beam housed in the interior door cavity. The lock rod and the other item share a connection therebetween, with the other item supporting the lock rod for movement. The impact beam crosses the other item from laterally between the other item and the door. The vehicle additionally includes an attack member and a push member housed in the interior door cavity. The attack member faces the lock rod from laterally between the door and the lock rod. The push member, along the impact beam, faces the other item from laterally between the other item and the door and laterally beyond the impact beam. When the door collapses when compromised by a side impact event, the door carries the attack member for attacking action on the lock rod. The door additionally carries the push member for counterpart pushing action on the other item. The connection between the lock rod and the other item thus breaks.

In another aspect, a method of disallowing a door of a vehicle from opening when compromised by a side impact event contemplates a door that houses, in an interior door cavity, a lock rod and another item supporting the lock rod for movement as part of a locking system for the door, and an impact beam crossing the other item from laterally between the other item and the door. In the method, when the door collapses when compromised by a side impact event, the door is employed to break a connection between the lock rod and the other item. Specifically, the door is employed to carry an attack member housed in the interior door cavity, and facing the lock rod from laterally between the door and the lock rod, for collapse-induced attacking action on the lock rod. The door is additionally employed to carry a push member housed in the interior door cavity along the impact beam, and facing the other item from laterally between the other item and the door and laterally beyond the impact beam, for collapse-induced counterpart pushing action on the other item.

In yet another aspect, a door for a vehicle includes an inner door panel and an outer door panel defining an interior door cavity therebetween, a handle assembly, a latch assembly with a latch and a linkage with a lock rod housed in the interior door cavity as part of a locking system for the door, and an impact beam housed in the interior door cavity. The handle assembly and the lock rod share a connection therebetween, and the lock rod and the latch assembly share a connection therebetween, with the handle assembly and the latch assembly together supporting the lock rod by opposing ends thereof for laterally orthogonal movement by which the linkage operates to actuate the latch. The impact beam crosses both an outboard push site and an inboard push site at the latch assembly from laterally between the latch assembly and the outer door panel. The vehicle additionally includes an attack member and a push member housed in the interior door cavity. The attack member projects into the interior door cavity from the inner door panel, and faces the lock rod from laterally between the inner door panel and the lock rod. The push member, along the impact beam, projects into the interior door cavity from the outer door panel around and laterally beyond the impact beam, and faces the latch assembly at the inboard push site from laterally between the latch assembly and the outer door panel. When the door collapses when compromised by a side impact event, the inner door panel carries the attack member for attacking action on the lock rod. Additionally, the outer door panel carries the push member for counterpart pushing action on the latch assembly at the inboard push site in coordination with counterpart pushing action by the impact beam on the latch assembly at the outboard push site. The connection between the lock rod and the latch assembly thus breaks.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle whose door houses a locking system in the same space as an impact beam. The locking system includes one or more latch assemblies that each include a latch, one or more handle assemblies that each include a user-accessible handle, and a linkage that includes a lock rod connected between each handle and all of the latches. In the locking system, an exterior handle assembly and a lower latch assembly together support the lock rod. Specifically, the lock rod is supported for laterally orthogonal movement by which the linkage operates, in response to the operation of any of the handles, to actuate all of the latches. The impact beam crosses the lower latch assembly from laterally between the lower latch assembly and the door.

In the same space as the locking system and the impact beam, the door additionally houses a disabling system for the lock rod, whose components serve to disable the lock rod when the door is compromised by a side impact event. The disabling system includes an attack member and a push member. The attack member faces the lock rod from laterally between the door and the lock rod. The push member, along the impact beam, faces the lower latch assembly from laterally between the lower latch assembly and the door and laterally beyond the impact beam. When the door collapses when compromised by a side impact event, the door carries the attack member for attacking action on the lock rod, and carries the push member for counterpart pushing action on the lower latch assembly. The connection between the lock rod and the lower latch assembly thus breaks, which disables the lock rod. Disabling the lock rod eliminates the prospect of functional disruption from the perspective of the linkage and the lock rod allowing the door to open notwithstanding that none of the handles are operated, or that the door is locked.

Figure 1:
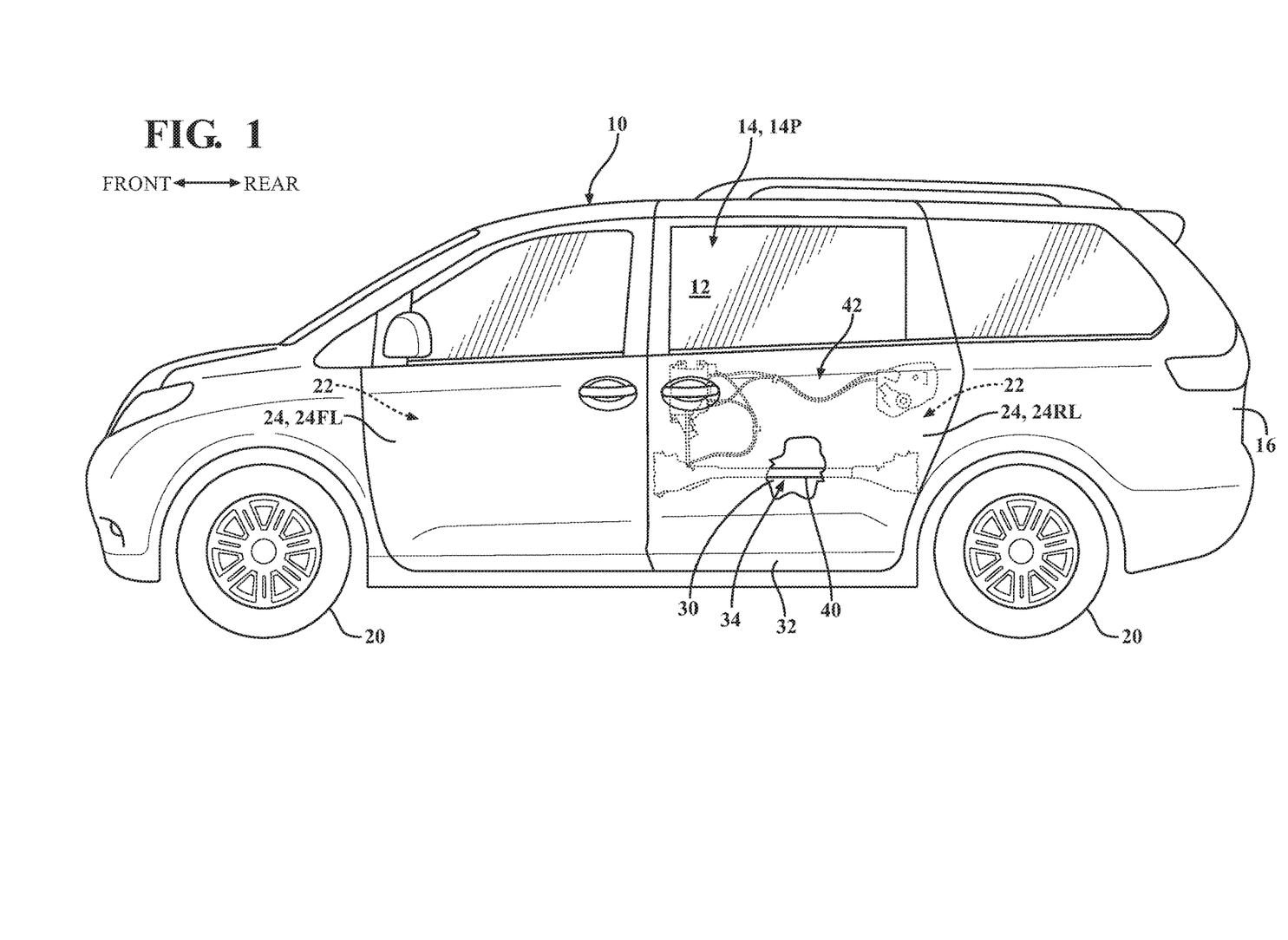
FIG. 1 is a side view of a vehicle including a number of doors, including a door that houses a locking system in the same space as an impact beam.

A representative passenger vehicle 10 is shown in FIG. 1. In this description, uses of "front," "forward" and the like, and uses of "rear," "rearward" and the like, refer to the longitudinal directions of the vehicle 10. "Front," "forward" and the like refer to the front (fore) of the vehicle 10, while "rear," "rearward" and the like refer to the back (aft) of the vehicle 10. Uses of "side," "sideways," "transverse" and the like refer to the lateral directions of the vehicle 10, with "driver's side" and the like referring to the left side of the vehicle 10, and "passenger side" and the like referring to the right side of the vehicle 10.

The vehicle 10 has an exterior 12 and a number of interior compartments 14. The compartments 14 include a passenger compartment 14P, an engine compartment and, in the illustrated minivan configuration of the vehicle 10, a cargo area. The vehicle 10 has a body 16 that forms its exterior 12 and defines its compartments 14. The body 16 has upright sides, as well as a floor, a front end, a rear end, a roof and the like.

The vehicle 10 may include, among other things, seats and a dash assembly housed in its passenger compartment 14P. Additionally, the vehicle 10 may include an engine, motor, transmission and other powertrain components housed in its engine compartment or elsewhere in the vehicle 10. Among these other powertrain components, the vehicle 10 includes wheels 20. The wheels 20 support the remainder of the vehicle 10 on the ground. One, some or all of the wheels 20 are powered by the remainder of the powertrain components to drive the vehicle 10 along the ground.

The body 16 defines a number of door openings 22 that open between the passenger compartment 14P and the exterior 12. The body 16 also has a number of doors 24 corresponding to the door openings 22. The doors 24 serve as closure panels for the passenger compartment 14P. Each door 24 is slidingly, pivotally or otherwise connected to the remainder of the body 16 for movement, relative to a corresponding door opening 22, between a closed position and an open position. In the closed position, the door 24 is positioned over the door opening 22, with the periphery of the door 24 adjacent the surrounding body 16 that frames the door opening 22. In the open position, on the other hand, the door 24 is positioned away from the door opening 22, which allows ingress into and egress out of the passenger compartment 14P.

In the illustrated minivan configuration of the vehicle 10, the body 16 has four doors 24, two of which are front doors 24 that are pivotally connected to the remainder of the body 16, and two of which are rear doors 24 that are slidingly connected to the remainder of the body 16. One driver's side front door 24FL is shown, with the other, passenger side front door 24, being a mirror image. Likewise, one driver's side rear door 24RL is shown, with the other, passenger side rear door 24, being a mirror image. This description follows with reference to the driver's side rear door 24RL. However, it will be understood that this disclosure is applicable in principle to the remaining doors 24, including but not limited to the passenger side rear door 24.

The door 24RL is constructed from rigidly interconnected door frame members and door panels, as well as any combination of overlying paneling, trim, upholstery and other door coverings. The door panels include an upright inner door panel 30 and an upright outer door panel 32. The inner door panel 30 and the outer door panel 32 are laterally spaced apart from one another. As a result, the door 24RL has an interior door cavity 34 defined between the inner door panel 30 and the outer door panel 32.

Among other things housed by the door 24RL in the space afforded by the door cavity 34, the vehicle 10 includes an elongate impact beam 40. The impact beam 40 is rigidly mounted to the door 24RL. The impact beam 40 principally functions when the door 24RL is compromised by a side impact event. Specifically, the impact beam 40 structurally reinforces the body 16 against the door 24RL laterally intruding into the passenger compartment 14P. For this purpose, the impact beam 40 longitudinally extends across the door 24RL, and overlaps the surrounding body 16 at both the front of the door 24RL and the rear of the door 24RL.

Figure 2:
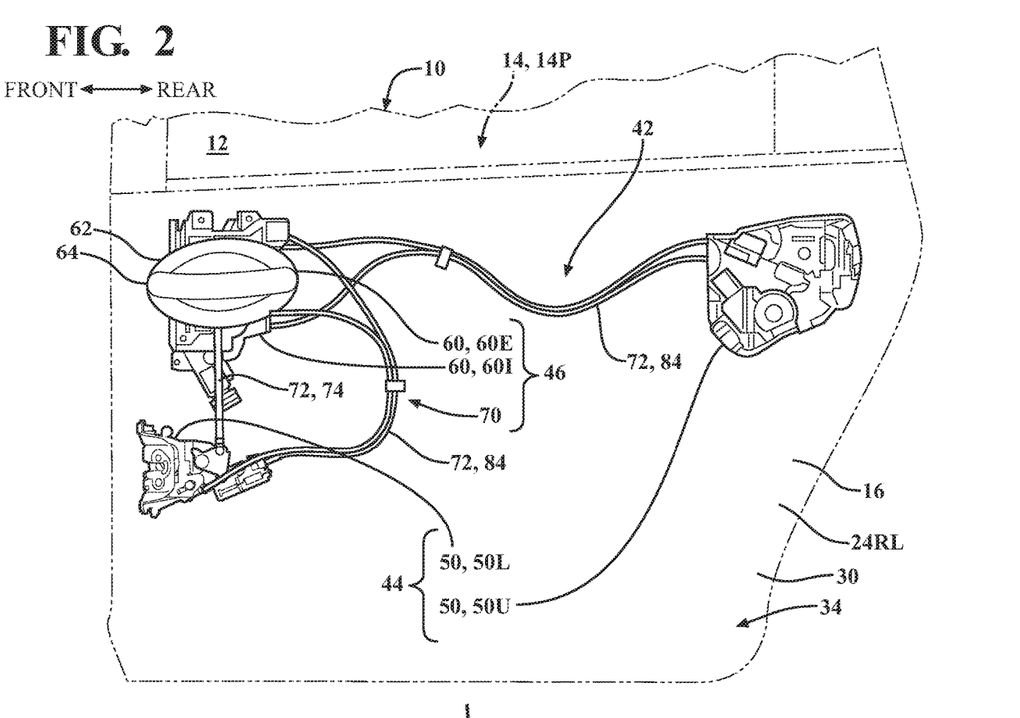
FIG. 2 is a front view of the door, with its outer door panel and the impact beam removed to view the locking system, showing one or more latch assemblies that embody a closing subsystem for closing the door, and one or more handle assemblies and a linkage that embody an opening subsystem for locking and unlocking the door, as well as for opening the door, with the linkage including a lock rod connected between an exterior handle assembly and a lower latch assembly.

As shown with additional reference to FIG. 2, in the same space as the impact beam 40, the vehicle 10 additionally includes a locking system 42 for the door 24RL. The locking system 42 operates to close the door 24RL, lock and unlock the door 24RL, and open the door 24RL. The locking system 42 has a closing subsystem 44, whose components serve to close the door 24RL, and an opening subsystem 46, whose components serve to lock and unlock the door 24RL, as well as to open the door 24RL.

The closing subsystem 44 is embodied by one or more latch assemblies 50. Each latch assembly 50 is rigidly mounted to the door 24RL as a unitary module. The closing subsystem 44 includes two latch assemblies 50, one of which is a lower latch assembly 50L located at the lower-front quadrant of the door 24RL, and one of which is an upper latch assembly 50U located at the upper-rear quadrant of the door 24RL.

Figure 3:
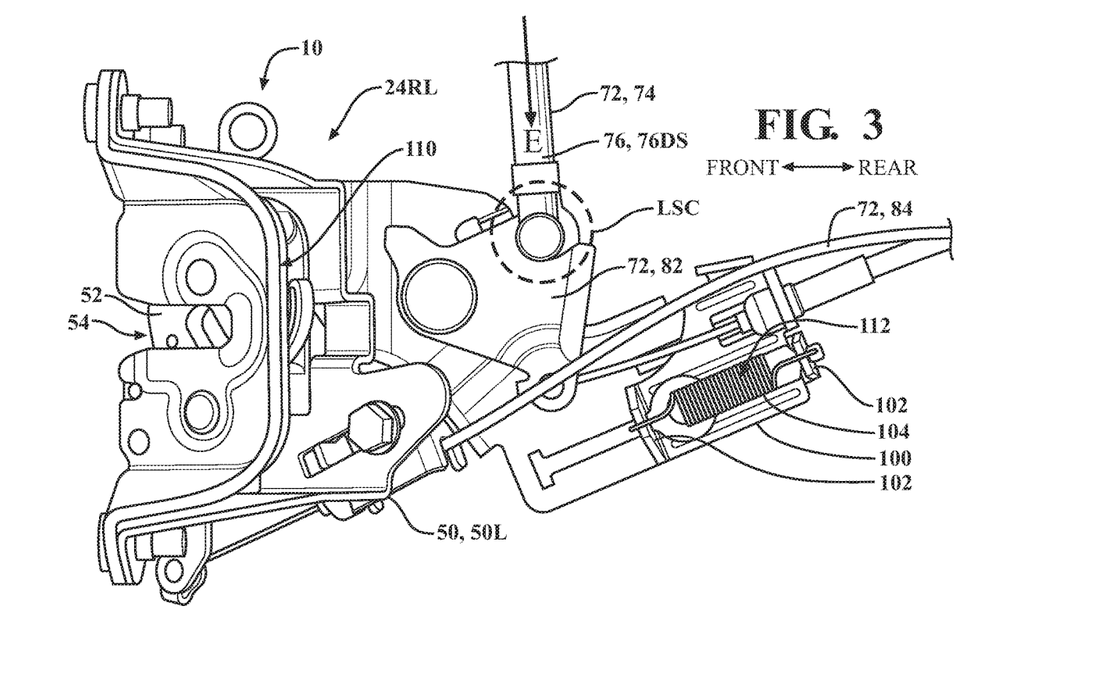
FIG. 3 is a side view of the lower latch assembly, showing representative aspects of the latch assemblies, as well as the connection between the lock rod and the lower latch assembly.

As shown with additional reference to FIG. 3, and as represented by the lower latch assembly 50L, the latch assemblies 50 each include a latch 52. The latches 52 each have a latching position and an unlatching position. The latch assemblies 50 support their respective latches 52, at the periphery of the door 24RL, for movement relative to the door 24RL between the latching positions and the unlatching positions. Specifically, from the latching positions, the latch assemblies 50 support their respective latches 52 for actuation or, in other words, movement to the unlatching positions. The latch assemblies 50 also support their respective latches 52 for movement from the unlatching positions to the latching positions.

The latches 52 principally function as the door 24RL is moved from the open position to the closed position, and afterward, when the door 24RL is in the closed position. As the door 24RL is moved from the open position to the closed position, each latch 52 contacts the surrounding body 16. This contact triggers movement of the latch 52 from the unlatching position to the latching position. In the latching position, each latch 52 is latched to the surrounding body 16. Afterward, with the latches 52 in the latching positions, the door 24RL is held in the closed position. The door 24RL is thus closed. Each latch 52 is actuated, on the other hand, via return movement to the unlatching position. In the unlatching position, each latch 52 is unlatched from the surrounding body 16. With the latches 52 in the unlatching positions, the door 24RL is allowed to open or, in other words, move from the closed position to the open position.

In one implementation, the latch assemblies 50 each define a striker chute 54, and the latches 52 are each structured as a rotor. Moreover, the surrounding body 16 includes a striker for each latch assembly 50. The striker for each latch assembly 50 corresponds to both its striker chute 54 and its latch 52, with the striker chute 54 configured to selectively receive the striker, and the latch 52 configured to selectively engage the striker. The latch assemblies 50 support their respective latches 52, in their respective striker chutes 54, for pivotation between the latching positions and the unlatching positions.

In this implementation, as the door 24RL is moved from the open position to the closed position, the respective strikers for the latch assemblies 50 enter their respective striker chutes 54, and each latch 52 contacts the striker for the latch assembly 50 to which the latch 52 belongs. This contact triggers pivotation of the latch 52, around the striker, from the unlatching position to the latching position. In the latching position, each latch 52, from the perspective of the latch assembly 50 to which the latch 52 belongs, engages the striker therefor to capture the striker in its striker chute 54. Each latch 52 is thereby latched to the surrounding body 16 to which the striker belongs. Each latch 52 is actuated, on the other hand, via return pivotation, from around the striker for the latch assembly 50 to which the latch 52 belongs, to the unlatching position. In the unlatching position, each latch 52, from the perspective of the latch assembly 50 to which the latch 52 belongs, disengages from the striker therefor to release the striker from its striker chute 54. Each latch 52 is thereby unlatched from the surrounding body 16 to which the striker belongs.

The opening subsystem 46 is embodied by one or more handle assemblies 60. Each handle assembly 60 is rigidly mounted to the door 24RL as a unitary module. The opening subsystem 46 includes two handle assemblies 60 located at the upper-front quadrant of the door 24RL, one of which is an interior handle assembly 60I at the inside of the door 24RL, and one of which is an exterior handle assembly 60E at the outside of the door 24RL. The interior handle assembly 60I is rigidly mounted to the inner door panel 30, and the exterior handle assembly 60E is rigidly mounted to the outer door panel 32.

As represented by the exterior handle assembly 60E, the handle assemblies 60 each include a bezel or other base 62 by which the handle assembly 60 is rigidly mounted to the door 24RL, and a user-accessible handle 64. The handles 64 each have a home position and a latch actuating position. The handle assemblies 60 support their respective handles 64 for pivotation or other movement relative to the door 24RL between the home positions and the latch actuating positions. Specifically, from the home positions, the handle assemblies 60 support their respective handles 64 for operation or, in other words, movement to the latch actuating positions. In the typical implementation where the handles 64 are operated via lateral movement away from the door 24RL to the latch actuating positions, each handle 64 is subject to being operated by a user via the user pulling the handle 64 away from the door 24RL. The handle assemblies 60 also support their respective handles 64 for automatic return movement from the latch actuating positions to the home positions.

The opening subsystem 46 is further embodied by a linkage 70. The linkage 70 is rigidly mounted to the door 24RL. The linkage 70 may be rendered by any combination of one or more parts of the handle assemblies 60, one or more parts of the latch assemblies 50, and one or more standalone items. The linkage 70 is connected between each handle 64 that belongs to a handle assembly 60, on the one hand, and all of the latches 52 that respectively belong to the latch assemblies 50, on the other hand. Accordingly, from the perspective of each handle 64, the linkage 70 is connected from the handle 64 to all of the latches 52. From the perspective of each latch 52, the linkage 70 is connected to the latch 52 from each of the handles 64.

The linkage 70 includes a succession of one or more interconnected links 72. The links 72 each have a home position and a latch actuating position. The linkage 70 supports the links 72 for movement relative to the door 24RL between the home positions and the latch actuating positions. Specifically, from the home positions, the linkage 70 supports the links 72 for excitation or, in other words, movement to the latch actuating positions. The linkage 70 also supports the links 72 for automatic return movement from the latch actuating positions to the home positions.

Figure 4:
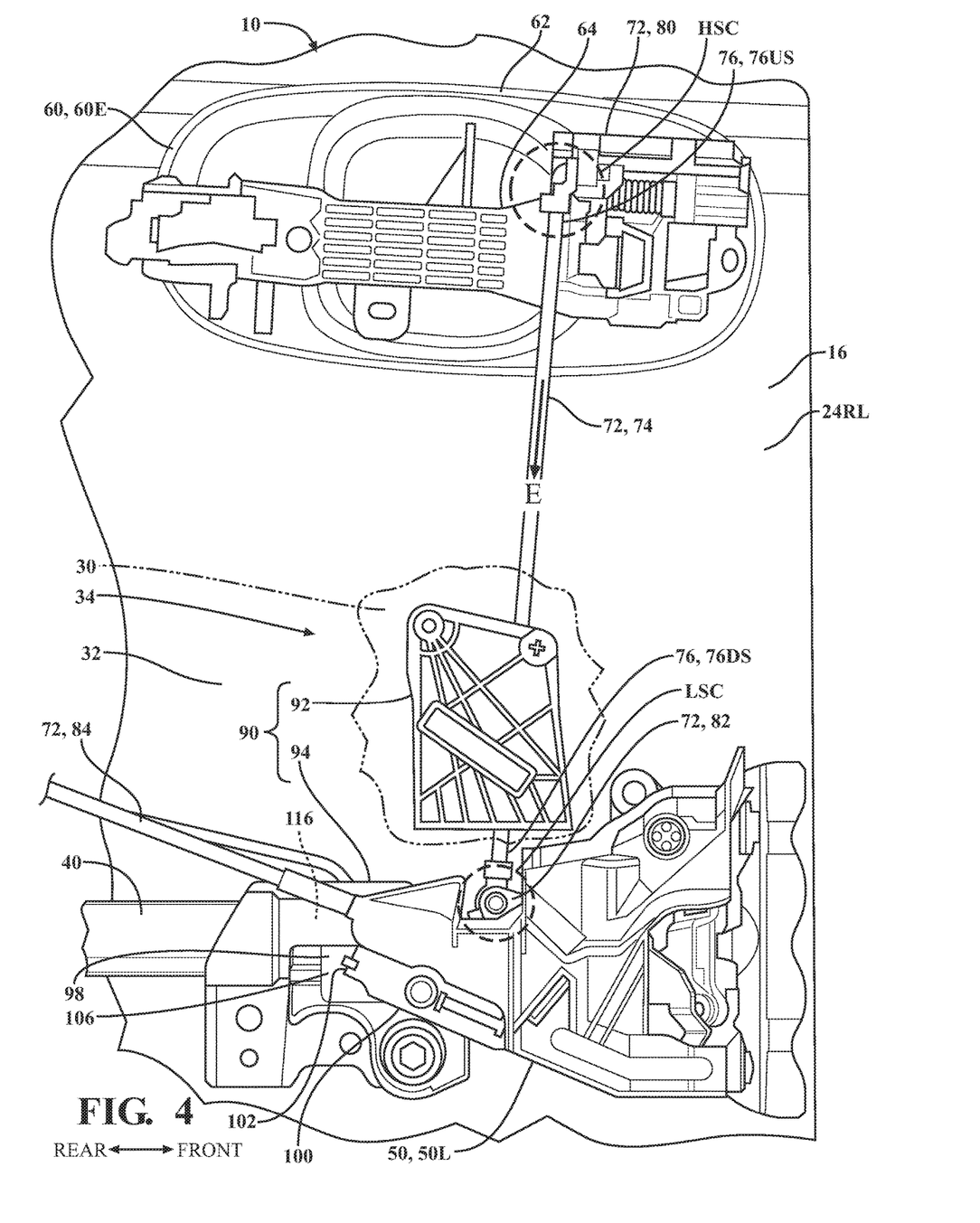
FIG. 4 is a back view of the door, with its inner door panel removed to view the impact beam, the locking system and, in the same space as the locking system and the impact beam, a disabling system for the lock rod that includes an attack member and a push member, showing the push member along the impact beam.
Figure 5:
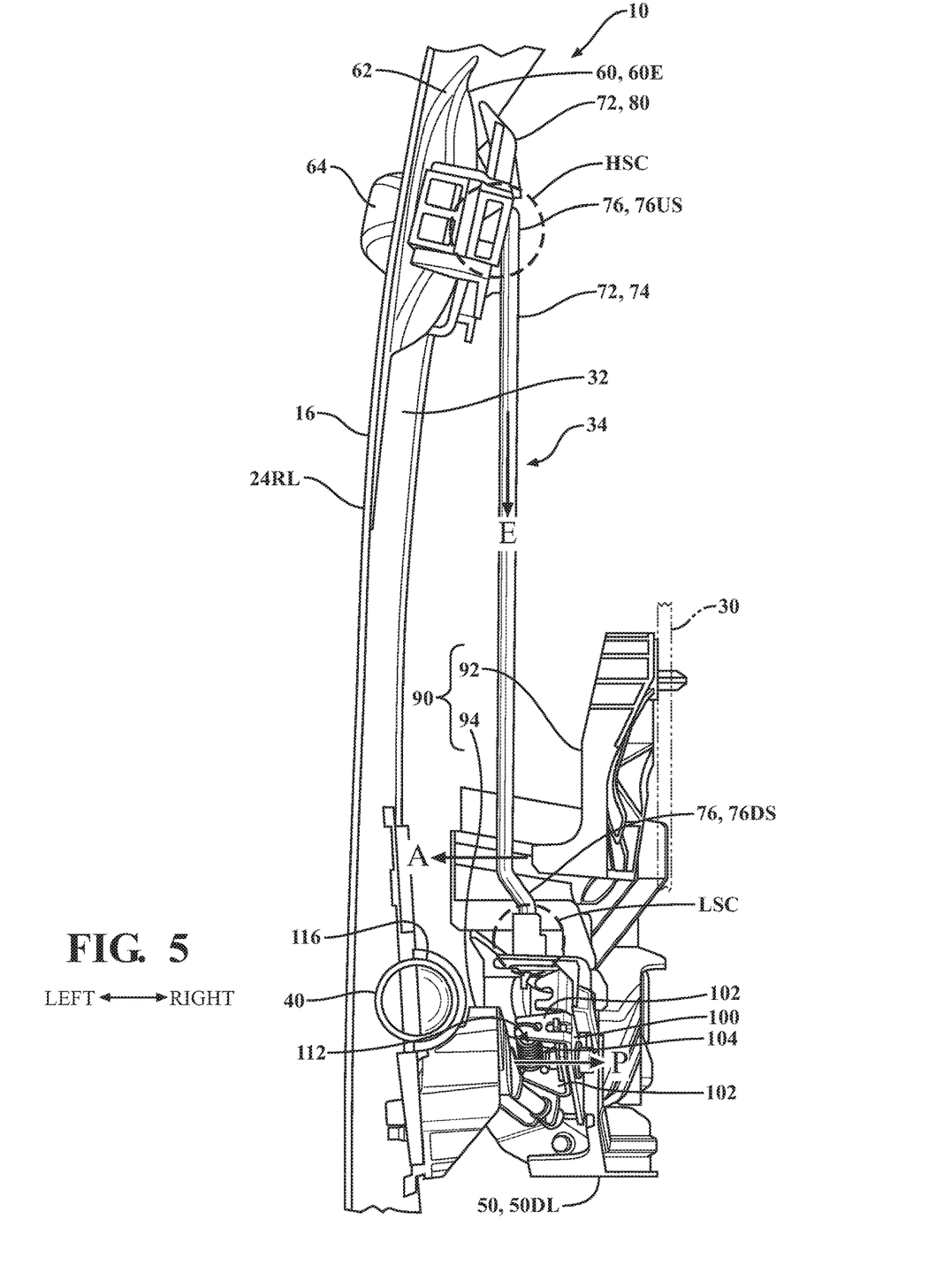
FIG. 5 is a cutaway partial side view of the door, showing the attack member facing the lock rod from laterally between the inner door panel and the lock rod, and the push member facing the lower latch assembly from laterally between the lower latch assembly and the outer door panel and laterally beyond the impact beam.

As shown with additional reference to FIGS. 4 and 5, and with the handles 64 represented by the handle 64 of the exterior handle assembly 60E, the linkage 70 includes an elongate lock rod 74. The lock rod 74 has two opposing ends 76. From the perspective of the linkage 70, one of the opposing ends 76 is an upstream end 76US, and one of the opposing ends 76 is a downstream end 76DS. The remainder of the linkage 70 besides the lock rod 74 has an upstream portion connected from the handle 64 to the upstream end 76US, and a downstream portion connected from the downstream end 76DS to all of the latches 52. In the downstream portion, the linkage 70 further includes a culminating link 72 for each latch 52. The culminating link 72 for each latch 52 is connected to the latch 52.

Beyond the standalone lock rod 74, the linkage 70 is rendered by both part of the exterior handle assembly 60E and part of the lower latch assembly 50L. Specifically, the upstream portion of the linkage 70 is in part rendered by part of the exterior handle assembly 60E, and the downstream portion of the linkage 70 is in part rendered by part of the lower latch assembly 50L. The exterior handle assembly 60E and the lower latch assembly 50L are laterally orthogonally spaced apart from one another, and the lock rod 74 is connected between them. As part of this connected relationship, the linkage 70 features a handle-side connection HSC, at the upstream end 76US of the lock rod 74, between the exterior handle assembly 60E and the lock rod 74. Moreover, the linkage 70 features a latch-side connection LSC, at the downstream end 76DS of the lock rod 74, between the lock rod 74 and the lower latch assembly 50L.

With the lock rod 74 connected between them, the exterior handle assembly 60E and the lower latch assembly 50L, on behalf of the linkage 70, together support the lock rod 74 by its upstream end 76US and its downstream end 76DS, respectively. With the exterior handle assembly 60E and the lower latch assembly 50L laterally orthogonally spaced apart from one another, the lock rod 74 is supported in a laterally orthogonal orientation. Relatedly, the lock rod 74 is supported for laterally orthogonal movement, relative to the exterior handle assembly 60E and the lower latch assembly 50L, between the home position and the latch actuating position, with the lock rod 74 being excited via laterally orthogonal movement from the home position to the latch actuating position. Specifically, from the home position, the lock rod 74 is excited via movement in a laterally orthogonal excitation direction E to the latch actuating position.

In one implementation, in order of succession from the handle 64, the linkage 70, in the upstream portion, further includes a lever 80 included as part of the exterior handle assembly 60E. The exterior handle assembly 60E, on behalf of the linkage 70, supports the lever 80 for pivotation between the home position and the latch actuating position, with the lever 80 being excited via pivotation from the home position to the latch actuating position. With the linkage 70 then including the lock rod 74, the handle-side connection HSC is made between the lever 80 and the lock rod 74. Then, in the downstream portion, the linkage 70 further includes a bell crank 82 included as part of the lower latch assembly 50L. The latch-side connection LSC is made between the lock rod 74 and the bell crank 82. The lower latch assembly 50L, on behalf of the linkage 70, supports the bell crank 82 for pivotation between the home position and the latch actuating position, with the bell crank 82 being excited via pivotation from the home position to the latch actuating position. With the lever 80 and the bell crank 82 each being excited via upright, downward pivotation toward the bottom of the door 24RL from the home position to the latch actuating position, the excitation direction E is downward. The linkage 70 then further includes one or more cable assemblies 84. With the rotor-structured latch 52 of the lower latch assembly 50L representing the latches 52, the linkage 70 may then further include a pawl or other link 72 included as part of the lower latch assembly 50L serving as the culminating link 72 for the latch 52.

The opening subsystem 46 principally functions when the door 24RL is closed, with all of the handles 64 in the home positions. With all of the handles 64 in the home positions, all of the links 72 are in the home positions as well. The opening subsystem 46 is subject to selective activation and deactivation by either the vehicle 10 (e.g., via an onboard ECU) or a user (e.g., via onboard or remote lock and unlock buttons), or both. When the opening subsystem 46 is activated, and any of the handles 64 are operated, the linkage 70 is operable to translate the associated movement of the handles 64 to the latch actuating positions into movement of all of the latches 52 to the unlatching positions. Accordingly, the linkage 70 is responsive to the operation of any of the handles 64 to actuate all of the latches 52. With the prospect of the door 24RL being thereby allowed to open, the door 24RL is thus unlocked. Contrariwise, there is no prospect of the door 24RL being allowed to open when none of the handles 64 are operated.

On the other hand, when the opening subsystem 46 is deactivated, and any of the handles 64 are operated, the linkage 70 is operable to not translate the associated movement of the handles 64 to the latch actuating position into movement of any of the latches 52 to the unlatching positions. Accordingly, the linkage 70 is unresponsive to the operation of any of the handles 64 to actuate any of the latches 52. With no prospect of the door 24RL being allowed to open, even if any of the handles 64 are operated, the door 24RL is thus locked.

The linkage 70, specifically, operates as the succession of links 72 that includes the lock rod 74 and the respective culminating links 72 for the latches 52. With the handles 64 represented by the handle 64 of the exterior handle assembly 60E, when the opening subsystem 46 is activated, and the handle 64 is operated, the associated movement of the handle 64 to the latch actuating position triggers the excitation of the lock rod 74 at its upstream end 76US. The associated movement of the lock rod 74 in the excitation direction E to the latch actuating position triggers a downstream succession of exciting the links 72 or, in other words, a link-to-link succession of exciting all of the links 72 in the downstream portion of the linkage 70, at the downstream end 76DS of the lock rod 74. As part of the downstream succession of exciting the links 72, the respective culminating links 72 for all of the latches 52 are excited. The associated movement of the culminating link 72 for each latch 52 to the latch actuating position triggers the actuation of the latch 52. Contrariwise, the downstream succession of exciting the links 72 is not triggered when the handle 64 is not operated.

On the other hand, when the opening subsystem 46 is deactivated, and the handle 64 is operated, the associated movement of the handle 64 to the latch actuating position does not trigger the excitation of the lock rod 74 at its upstream end 76US. Without the associated movement of the lock rod 74 in the excitation direction E to the latch actuating position, the downstream succession of exciting the links 72 is not triggered at the downstream end 76DS of the lock rod 74. Without the downstream succession of exciting the links 72, none of the respective culminating links 72 for any of the latches 52 are excited. And, without the associated movement of the culminating link 72 for each latch 52 to the latch actuating position, the actuation of the latch 52 is not triggered.

With the door 24RL closed and the handles 64 in the home positions, the opening subsystem 46 alternatingly functions to either allow the door 24RL to open or keep the door 24RL closed. Once operation of the vehicle 10 is underway, the door 24RL is meant to remain closed. In normal operation of the vehicle 10, the opening subsystem 46 functions to keep the door 24RL closed by eliminating the prospect of the door 24RL being allowed to open. Specifically, there is no prospect of the door 24RL being allowed to open when users refrain from operating any of the handles 64. Moreover, there is no prospect of the door 24RL being allowed to open, even if any of the handles 64 are operated, when the door 24RL is locked by deactivating the opening subsystem 46.

By design, the door 24RL is subject to being compromised by side impact events in order to absorb the associated lateral forces on the door 24RL. As opposed to its functioning in normal operation of the vehicle 10, the opening subsystem 46 is sometimes subject to functional disruption with respect to keeping the door 24RL closed when the door 24RL is compromised by a side impact event. This is particularly the case from the perspective of the linkage 70 and the lock rod 74.

For instance, the door 24RL collapses or, in other words, experiences lateral movement of the outer door panel 32 and the inner door panel 30 toward one another, when compromised by a side impact event. When the door 24RL collapses, with the associated lateral movement of the outer door panel 32 toward the inner door panel 30, both the exterior handle assembly 60E and its handle 64 laterally move toward the inner door panel 30 as well. As opposed to the exterior handle assembly 60E, which is rigidly mounted to the outer door panel 32, the handle 64 is supported by the exterior handle assembly 60E for operation via movement to the latch actuating position. In the typical implementation where the handle 64 is operated via lateral movement away from the door 24RL to the latch actuating position, the opening subsystem 46 is subject to functional disruption in cases where, as a product of its inertia, the handle 64 laterally moves toward the inner door panel 30 to a lesser extent than the exterior handle assembly 60E. Specifically, in some cases, the lesser extent that the handle 64 laterally moves toward the inner door panel 30 compared to the exterior handle assembly 60E amounts to simulated operation of the handle 64.

When the opening subsystem 46 is activated, the simulated operation of the handle 64 raises the prospect of allowing the door 24RL to open notwithstanding that none of the handles 64 are operated. Specifically, the linkage 70 could respond to the simulated operation of the handle 64 to actuate all of the latches 52 in largely the same way it would respond to the operation of the handle 64. Among other things, the response of the linkage 70 includes the downstream succession of exciting the links 72 being triggered at the downstream end 76DS of the lock rod 74.

The door 24RL also bows when compromised by a side impact event. When the door 24RL bows, the exterior handle assembly 60E and the lower latch assembly 50L, among other laterally orthogonally spaced items rigidly mounted to the door 24RL, laterally orthogonally move toward one another. As opposed to the exterior handle assembly 60E and the lower latch assembly 50L themselves, which are rigidly mounted to the door 24RL, the lock rod 74 is supported for excitation, relative to them, via movement in the excitation direction E to the latch actuating position. With the excitation direction E being laterally orthogonal, the opening subsystem 46 is subject to functional disruption in cases where the lock rod 74 laterally orthogonally moves relative to the exterior handle assembly 60E and the lower latch assembly 50L under their associated laterally orthogonal movement toward one another. Specifically, in some cases, the laterally orthogonal movement of lock rod 74 relative to the exterior handle assembly 60E and the lower latch assembly 50L amounts to simulated excitation of the lock rod 74 at its upstream end 76US.

The simulated excitation of the lock rod 74 at its upstream end 76US raises the prospect of allowing the door 24RL to open notwithstanding that the door 24RL is locked by deactivating the opening subsystem 46. Specifically, the linkage 70 could respond to the simulated excitation of the lock rod 74 at its upstream end 76US to actuate all of the latches 52 in largely the same way it would respond to the operation of the handle 64 when the opening subsystem 46 is activated. Once again, among other things, the response of the linkage 70 includes the downstream succession of exciting the links 72 being triggered at the downstream end 76DS of the lock rod 74.

Figure 6:
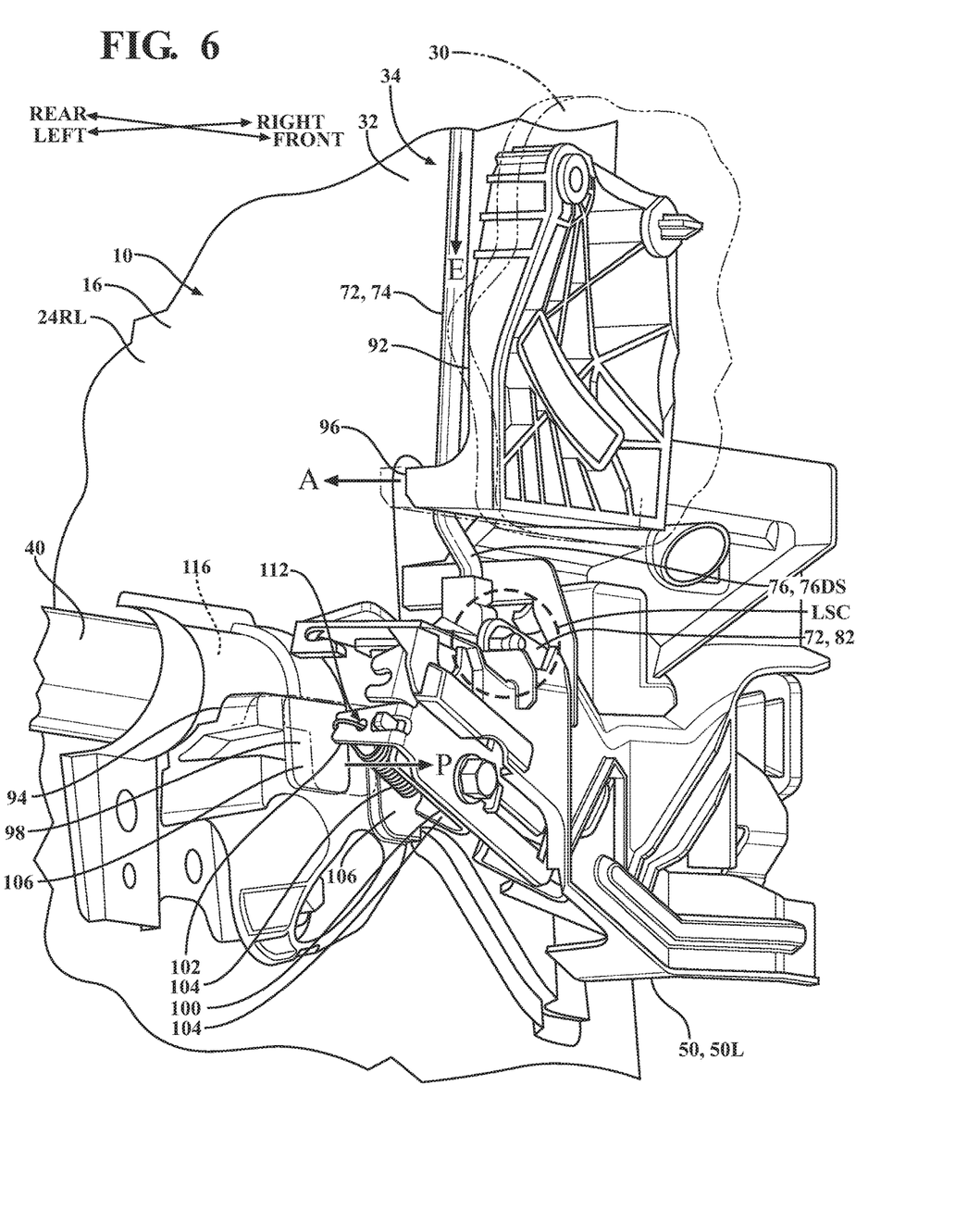
FIG. 6 is a cutaway partial perspective view of the door, showing, when the door collapses when compromised by a side impact event, the inner door panel carrying the attack member for attacking action on the lock rod, and the outer door panel carrying the push member for counterpart pushing action on the lower latch assembly, to thus break the connection between the lock rod and the lower latch assembly.
Figure 7:
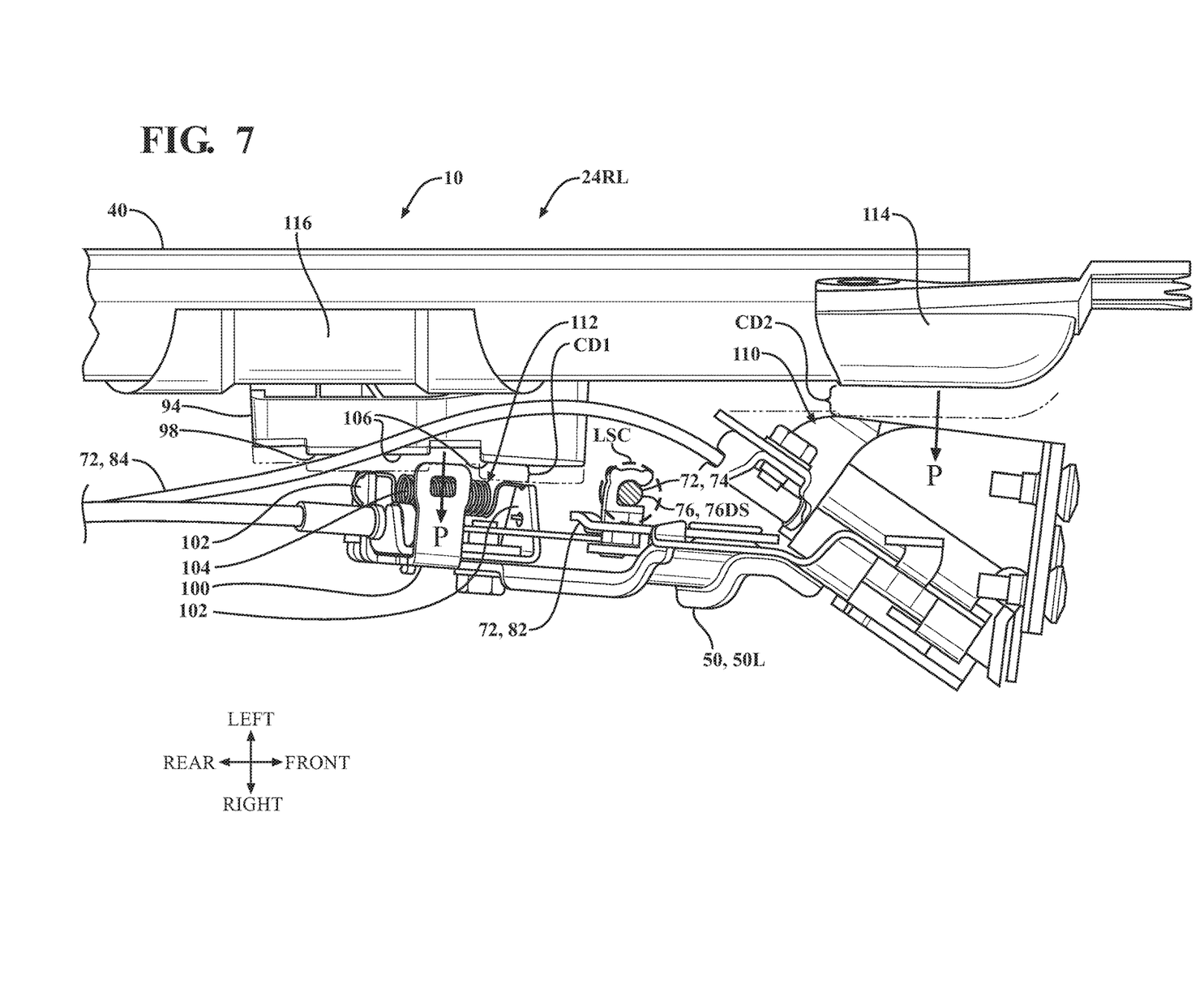
FIG. 7 is a partial top view of the impact beam, the lower latch assembly and the push member in isolation, showing, when the door collapses when compromised by a side impact event, aspects of coordination of the counterpart pushing action by the push member on the lower latch assembly with counterpart pushing action by the impact beam on the lower latch assembly.

As shown with additional reference to FIGS. 6 and 7, in the same space as the locking system 42 and the impact beam 40, the vehicle 10 additionally includes a disabling system 90 for the lock rod 74, whose components serve to disable the lock rod 74 when the door 24RL is compromised by a side impact event. Disabling the lock rod 74 eliminates the prospect of functional disruption to the opening subsystem 46 allowing the door 24RL to open notwithstanding that none of the handles 64 are operated, or that the door 24RL is locked by deactivating the opening subsystem 46.

The disabling system 90 is embodied by a breaking configuration for the latch-side connection LSC between the lock rod 74 and the lower latch assembly 50L. The latch-side connection LSC is uniquely subject to snap-apart or other clean breaking under the application of lateral breaking force between the lock rod 74 and the lower latch assembly 50L. Specifically, the latch-side connection LSC breaks under the application of "attacking" force to the lock rod 74 in a lateral attack direction A. The application of attacking force to the lock rod 74 in the attack direction A is promoted by the application of counterpart "pushing" force to the lower latch assembly 50L in a lateral push direction P opposing the attack direction A. The latch-side connection LSC is relatedly subject to being snapped-together or otherwise made under the application of counterpart lateral making force between the lock rod 74 and the lower latch assembly 50L.

When the latch-side connection LSC breaks under the application of attacking force to the lock rod 74 in the lateral attack direction A, the lock rod 74 is disconnected from the lower latch assembly 50L at its downstream end 76DS, where the now broken latch-side connection LSC was made. Otherwise, when no force is applied between the lock rod 74 and the lower latch assembly 50L, or when force applied to the lock rod 74 is insubstantial in the attack direction A, the latch-side connection LSC does not break. When the latch-side connection LSC is not broken, the lock rod 74 remains connected to the lower latch assembly 50L at its downstream end 76DS.

With the excitation direction E being laterally orthogonal, and the attack direction A being lateral, the attack direction A is orthogonal to the excitation direction E. With the attack direction A being orthogonal to the excitation direction E, the latch-side connection LSC does not break when the lock rod 74 is excited at its upstream end 76US. Specifically, when the lock rod 74 is excited at its upstream end 76US, the associated movement of the lock rod 74 in the excitation direction E to the latch actuating position triggers the downstream succession of exciting the links 72 at the downstream end 76DS of the lock rod 74. Although force is applied to the lock rod 74, the force is applied thereto in the excitation direction E and, as a result, is insubstantial in the attack direction A. Relatedly, applying attacking force to the lock rod 74 in the attack direction A has no tendency of amounting to simulated excitation of the lock rod 74 at its upstream end 76US.

For purposes of applying lateral breaking force between the lock rod 74 and the lower latch assembly 50L, the disabling system 90 includes an attack member 92 and a push member 94. The attack member 92 and the push member 94 are each rigidly mounted to the door 24RL. The attack member 92 and the push member 94 neighbor the latch-side connection LSC in the interior door cavity 34, and laterally face toward one another.

The attack member 92 neighbors the latch-side connection LSC from a location laterally between the door 24RL and the lock rod 74. From the door 24RL, the attack member 92 projects into the interior door cavity 34 in the attack direction A toward the lock rod 74, and faces the lock rod 74 in the attack direction A. Specifically, the attack member 92 faces the lock rod 74 in the attack direction A at a distal, overhanging upright attack face 96. The push member 94 neighbors the latch-side connection LSC from a location laterally between the lower latch assembly 50L and the door 24RL. From the door 24RL, the push member 94 projects into the interior door cavity 34 in the push direction P toward the lower latch assembly 50L, and faces the lower latch assembly 50L in the push direction P. Specifically, the push member 94 faces the lower latch assembly 50L in the push direction P at a distal, overhanging upright push face 98.

The attack member 92 and the push member 94 each have a home position, as shown in FIGS. 4-7. In normal operation of the vehicle 10, the door 24RL statically supports the attack member 92 and the push member 94 relative to the door 24RL in their respective home positions. From their respective home positions, the attack member 92 and the push member 94 are activated via opposing lateral movement relative to the latch-side connection LSC toward one another. Specifically, from the home position, the attack member 92 is activated via movement in the attack direction A toward the lock rod 74. From the home position, the push member 94 is activated via movement in the push direction P toward the lower latch assembly 50L.

In the interior door cavity 34, the attack face 96 has an unobstructed path to the lock rod 74 in the attack direction A. Accordingly, when the attack member 92 is activated via movement in the attack direction A toward the lock rod 74, the attack face 96 has an unobstructed path to, on behalf of the attack member 92, forcibly engage the lock rod 74 in the attack direction A. The push face 98 has an unobstructed path to the lower latch assembly 50L in the push direction P. Accordingly, when the push member 94 is activated via movement in the push direction P toward the lower latch assembly 50L, the push face 98 has an unobstructed path to, on behalf of the push member 94, forcibly engage the lower latch assembly 50L in the push direction P.

In one implementation, the lower latch assembly 50L has a spring bracket 102 at the location where the push member 94 faces the lower latch assembly 50L in the push direction P at the push face 98. The spring bracket 102 features two upturned sides 102 that are laterally orthogonally spaced apart from one another, and carries a spring 104 between the upturned sides 102. Relatedly, the push face 98 features two pads 106 that are laterally orthogonally spaced apart from one another, one of which faces one upturned side 102, and the other of which faces the other upturned side 102. In this implementation, when the push member 94 is activated via movement in the push direction P toward the lower latch assembly 50L, the pads 106 respectively have unobstructed paths to, on behalf of the push member 94, forcibly engage the lower latch assembly 50L at the upturned sides 102 in the push direction P. With the pads 106 afterward respectively engaging the lower latch assembly 50L at the upturned sides 102 or other multiple, laterally orthogonally spaced apart push points, the push member 94 applies stabilized pushing force to the lower latch assembly 50L in the push direction P that reduces the pressure on any given push point.

The attack direction A is a laterally inside-to-outside direction. By extension, the push direction P is the opposing laterally outside-to-inside direction. To face the lock rod 74 in the attack direction A, the attack member 92 is located laterally between the inner door panel 30 and the lock rod 74. The attack member 92 is rendered by a standalone block-like structure that is rigidly fastened to the inner door panel 30. From the inner door panel 30, the attack member 92 projects into the interior door cavity 34 in the attack direction A toward the lock rod 74, and terminates at the attack face 96. To face the lower latch assembly 50L in the push direction P, the push member 94 is located laterally between the lower latch assembly 50L and the outer door panel 32. The push member 94 is rendered by a standalone block-like structure that is rigidly fastened to any combination of the outer door panel 32 and the impact beam 40. As shown, from the outer door panel 32, the push member 94 projects into the interior door cavity 34 in the push direction P toward the lower latch assembly 50L, and terminates at the push face 98. Alternatively, the push member 94 could otherwise similarly project into the interior door cavity 34 from the impact beam 40.

The disabling system 90 principally functions once operation of the vehicle 10 is underway when, in the midst of normal operation of the vehicle 10, the door 24RL is compromised by a side impact event. As opposed to cases where the opening subsystem 46 is subject to associated functional disruption with respect to keeping the door 24RL closed, the door 24RL employs the same side impact event to activate the attack member 92 and the push member 94. Specifically, when the door 24RL collapses, the door 24RL employs the associated lateral movement of the outer door panel 32 toward the inner door panel 30 to carry the attack member 92 and the push member 94 for activation via opposing lateral movement toward one another.

When the door 24RL collapses, with the associated lateral movement of the outer door panel 32 toward the inner door panel 30, the inner door panel 30, on behalf of the door 24RL, carries the attack member 92 for movement in the attack direction A toward the lock rod 74. With the attack member 92 thereby activated, the attack face 96, on behalf of the attack member 92, forcibly engages the lock rod 74 in the attack direction A. Afterward, with the attack member 92 forcibly engaging the lock rod 74 in the attack direction A, the attack member 92 applies attacking force to the lock rod 74 in the attack direction A. At the same time, the outer door panel 32, on behalf of the door 24RL, carries the push member 94 for movement in the push direction P toward the lower latch assembly 50L. With the push member 94 thereby activated, the push face 98, on behalf of the push member 94, forcibly engages the lower latch assembly 50L in the push direction P. Afterward, with the push face 98 forcibly engaging the lower latch assembly 50L in the push direction P, the push member 94 applies pushing force to the lower latch assembly 50L in the push direction P.

With attacking force applied to the lock rod 74 in the attack direction A, and promoted by the application of pushing force to the lower latch assembly 50L in the push direction P, lateral breaking force is applied between the lock rod 74 and the lower latch assembly 50L. The latch-side connection LSC thus breaks. When the latch-side connection LSC breaks, the lock rod 74, being disconnected from the lower latch assembly 50L at its downstream end 76DS, is disabled. And, when the lock rod 74 is disabled, the prospect of functional disruption to the opening subsystem 46 allowing the door 24RL to open notwithstanding that none of the handles 64 are operated, or that the door 24RL is locked by deactivating the opening subsystem 46, is eliminated. Specifically, the response of the linkage 70 to either the simulated operation of the handle 64 or the simulated excitation of the lock rod 74 at its upstream end 76US, or both, can no longer include the downstream succession of exciting the links 72 being triggered at the downstream end 76DS of the lock rod 74.

The opposing lateral movement of the attack member 92 and the push member 94 toward one another is collapse-induced via the associated lateral movement of the outer door panel 32 toward the inner door panel 30. Otherwise, in normal operation of the vehicle 10, the disabling system 90 is dormant. Specifically, without the associated lateral movement of the outer door panel 32 toward the inner door panel 30, the door 24RL statically supports the attack member 92 and the push member 94 in their respective home positions. The latch-side connection LSC thus does not break. With the lock rod 74 remaining connected to the lower latch assembly 50L at its downstream end 76DS, and relatedly not disabled, the opening subsystem 46 alternatingly functions to either allow the door 24RL to open or keep the door 24RL closed.

Among other things, the counterpart pushing action by the push member 94 on the lower latch assembly 50L advances the timing of the attacking action by the attack member 92 on the lock rod 74 and, by extension, the timing of breaking the latch-side connection LSC. Moreover, the pushing action by the push member 94 on the lower latch assembly 50L ensures the requisite clearance in the interior door cavity 34, as the outer door panel 32 laterally moves toward the inner door panel 30, for the associated disconnection of the lock rod 74 from the lower latch assembly 50L at its downstream end 76DS.

In one implementation, the impact beam 40 is subject to similar pushing action on the lower latch assembly 50L as the push member 94 when the door 24RL collapses. Relatedly, the push member 94 is part of a collaborative relationship between the lower latch assembly 50L, the impact beam 40 and the push member 94 for purposes of promoting the attacking action by the attack member 92 on the lock rod 74 via the application of pushing force to the lower latch assembly 50L in the push direction P. Specifically, from a location along the impact beam 40, the push member 94 coordinates its own pushing action on the lower latch assembly 50L with the pushing action by the impact beam 40 on the lower latch assembly 50L.

The impact beam 40 crosses the location of the lower latch assembly 50L at the lower-front quadrant of the door 24RL. Similarly to the push member 94, the impact beam 40 neighbors the latch-side connection LSC in the interior door cavity 34 from a location laterally between the lower latch assembly 50L and the door 24RL, and faces the lower latch assembly 50L in the push direction P. With the push direction P being the laterally outside-to-inside direction, the impact beam 40 is located laterally between the lower latch assembly 50L and the outer door panel 32. Also similarly to the push member 94, when the door 24RL collapses, the impact beam 40 is subject to being moved relative to the latch-side connection LSC in the push direction P toward the lower latch assembly 50L. Specifically, with the associated lateral movement of the outer door panel 32 toward the inner door panel 30, the outer door panel 32, on behalf of the door 24RL, carries the impact beam 40 for movement in the push direction P toward the lower latch assembly 50L. Relatedly, the impact beam 40 is subject to forcibly engaging the lower latch assembly 50L in the push direction P, and is therefore subject to applying pushing force to the lower latch assembly 50L in the push direction P.

With reference particularly to FIG. 7, facing the push direction P, the lower latch assembly 50L has a laterally outboard push site 110 and a laterally inboard push site 112. In the interior door cavity 34, the outboard push site 110 is laterally nearer to the door 24RL than the inboard push site 112. Specifically, with the push direction P being the laterally outside-to-inside direction, the outboard push site 110 is laterally nearer to the outer door panel 32 than the inboard push site 112. With the outboard push site 110 being laterally nearer to the door 24RL than the inboard push site 112 facing the push direction P, the outboard push site 110 and the inboard push site 112 are laterally offset from one another. Moreover, the outboard push site 110 and the inboard push site 112 are laterally orthogonally spaced apart from one another about the latch-side connection LSC. As a result, the outboard push site 110 and the inboard push site 112 laterally orthogonally flank the latch-side connection LSC.

The impact beam 40 not only crosses the location of the lower latch assembly 50L, but also crosses both the outboard push site 110 and the inboard push site 112. Relatedly, the impact beam 40 faces both the outboard push site 110 and the inboard push site 112 in the push direction P. Specifically, the impact beam 40 faces the outboard push site 110 in the push direction P at an open segment 114, and faces the inboard push site 112 in the push direction P at an unopen segment 116. Similarly to the outboard push site 110 and the inboard push site 112, the open segment 114 and the unopen segment 116 are laterally orthogonally spaced apart from one another about the latch-side connection LSC. And, beyond being laterally orthogonally spaced apart from one another, the open segment 114 and the unopen segment 116 laterally orthogonally flank the latch-side connection LSC.

The push member 94 is located along the impact beam 40 at the unopen segment 116. In the interior door cavity 34, the open segment 114 has an unobstructed path to the outboard push site 110 in the push direction P. Accordingly, when the impact beam 40 moves in the push direction P toward the lower latch assembly 50L, the open segment 114 has an unobstructed path to, on behalf of the impact beam 40, forcibly engage the lower latch assembly 50L at the outboard push site 110 in the push direction P. The push member 94, from the location at the unopen segment 116, prevents similar pushing action by the unopen segment 116 on the lower latch assembly 50L at the inboard push site 112 in favor of its own pushing action. Specifically, from the door 24RL, the push member 94 projects into the interior door cavity 34 in the push direction P toward the lower latch assembly 50L around and laterally beyond the impact beam 40. Relatedly, the push member 94 faces the lower latch assembly 50L at the inboard push site 112 in the push direction P, at the push face 98, from laterally beyond the impact beam 40. In the interior door cavity 34, the push face 98 has an unobstructed path to the inboard push site 112 in the push direction P. Accordingly, when the push member 94 is activated via movement in the push direction P toward the lower latch assembly 50L, the push face 98 has an unobstructed path to, on behalf of the push member 94, forcibly engage the lower latch assembly 50L at the inboard push site 112 in the push direction P.

In the interior door cavity 34, the open segment 114 is laterally nearer to the door 24RL than the push face 98. Specifically, with the push direction P being the laterally outside-to-inside direction, the open segment 114 is laterally nearer to the outer door panel 32 than the push face 98. With the open segment 114 being laterally nearer to the door 24RL than the push face 98 in the push direction P, the open segment 114 and the push face 98 are laterally offset from one another. The open segment 114 and the push face 98 are laterally offset from one another to substantially the same extent as the outboard push site 110 and the inboard push site 112 are laterally offset from one another. As a result, a closing distance CD1 in the push direction P, between the impact beam 40 at the open segment 114 and the outboard push site 110, is substantially the same as a closing distance CD2 in the push direction P, between the push member 94 at the push face 98 and the inboard push site 112.

When the door 24RL collapses, and the impact beam 40 moves in the push direction P toward the lower latch assembly 50L, the open segment 114, on behalf of the impact beam 40, forcibly engages the lower latch assembly 50L at the outboard push site 110 in the push direction P. Afterward, with the open segment 114 forcibly engaging the lower latch assembly 50L at the outboard push site 110 in the push direction P, the impact beam 40 applies pushing force to the lower latch assembly 50L at the outboard push site 110 in the push direction P. Similarly, when the push member 94 moves in the push direction P toward the lower latch assembly 50L, the push face 98, on behalf of the push member 94, forcibly engages the lower latch assembly 50L at the inboard push site 112 in the push direction P. Afterward, with the push face 98 forcibly engaging the lower latch assembly 50L at the inboard push site 112 in the push direction P, the push member 94 applies pushing force to the lower latch assembly 50L at the inboard push site 112 in the push direction P.

As a product of the collaborative relationship between the lower latch assembly 50L, the impact beam 40 and the push member 94, the pushing action by the push member 94 on the lower latch assembly 50L at the inboard push site 112 is initiated at substantially the same as the pushing action by the impact beam 40 on the lower latch assembly 50L at the outboard push site 110. Specifically, since the closing distance CD1 is substantially the same as the closing distance CD2, the open segment 114 and the push face 98 respectively close together in the push direction P on the outboard push site 110 and the inboard push site 112. Accordingly, the push member 94 initiates the application of pushing force to the lower latch assembly 50L at the outboard push site 110 in the push direction P at substantially the same as the impact beam 40 initiates the application of pushing force to the lower latch assembly 50L at the inboard push site 112 in the push direction P. Afterward, the pushing action by the push member 94 on the lower latch assembly 50L at the inboard push site 112 balances the pushing action by the impact beam 40 on the lower latch assembly 50L at the outboard push site about the latch-side connection LSC. Specifically, the open segment 114 and the unopen segment 116, where the push member 94 is located, laterally orthogonally flank the latch-side connection LSC. Accordingly, the pushing force applied by the push member 94 to the lower latch assembly 50L at the outboard push site 110 in the push direction P, and the pushing force applied by the impact beam 40 to the lower latch assembly 50L at the inboard push site 112 in the push direction P, are balanced about the latch-side connection LSC.

Relatedly, the pushing action by the push member 94 on the lower latch assembly 50L at the inboard push site 112 is coordinated with the pushing action by the impact beam 40 on the lower latch assembly 50L at the outboard push site to advance the timing of the attacking action by the attack member 92 on the lock rod 74 without subjecting the disabling system 90 to functional disruption with respect to disabling the lock rod 74. For instance, in the absence of either the pushing action by the push member 94 on the lower latch assembly 50L at the inboard push site 112 or the pushing action by the impact beam 40 on the lower latch assembly 50L at the outboard push site, but not the other, the lower latch assembly 50L could skew about the latch-side connection LSC from the perspective of the lock rod 74. The lower latch assembly 50L skewing about the latch-side connection LSC raises the prospect of the lock rod 74 remaining connected to the lower latch assembly 50L at its downstream end 76DS, and relatedly not disabled, notwithstanding the attacking action by the attack member 92 on the lock rod 74. Specifically, the latch-side connection LSC could bind, and render the application of attacking force to the lock rod 74 in the lateral attack direction A ineffective for breaking the latch-side connection LSC.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:
1. A vehicle, comprising:
a door with an interior door cavity;
a lock rod and another item housed in the interior door cavity as part of a locking system for the door, the lock rod and the other item sharing a connection therebetween, with the other item supporting the lock rod for movement;

an impact beam housed in the interior door cavity and crossing the other item from laterally between the other item and the door; and an attack member and a push member housed in the interior door cavity, the attack member facing the lock rod from laterally between the door and the lock rod, and the push member, along the impact beam, facing the other item from laterally between the other item and the door and laterally beyond the impact beam; whereby when the door collapses when compromised by a side impact event, the door carries the attack member to apply attacking force to the lock rod, and carries the push member to apply counterpart pushing force to the other item, to thus break the connection between the lock rod and the other item.

2. The vehicle of claim 1, wherein when the door collapses when compromised by a side impact event, the door carries the push member to apply counterpart pushing force to the other item in coordination with counterpart pushing force applied by the impact beam to the other item.

3. The vehicle of claim 1, wherein the impact beam crosses both an outboard push site and an inboard push site at the other item, the push member faces the other item at the inboard push site from laterally beyond the impact beam, and when the door collapses when compromised by a side impact event, the door carries the push member to apply counterpart pushing force to the other item at the inboard push site in coordination with counterpart pushing force applied by the impact beam to the other item at the outboard push site.

4. The vehicle of claim 3, wherein the outboard push site and the inboard push site laterally orthogonally flank the connection between the lock rod and the other item.

5. The vehicle of claim 1, wherein the other item supports the lock rod for laterally orthogonal movement.

6. The vehicle of claim 1, wherein when the door collapses when compromised by a side impact event, the door carries the attack member in a laterally inside-to-outside direction to apply attacking force to the lock rod, and carries the push member in a laterally outside-to-inside direction to apply counterpart pushing force to the other item.

7. The vehicle of claim 1, wherein the connection between the lock rod and the other item is subject to snap-apart breaking, and with the attacking force applied by the attack member to the lock rod, and the counterpart pushing force applied by the push member to the other item, the connection between the lock rod and the other item thus snaps apart.

8. The vehicle of claim 7, wherein the connection between the lock rod and the other item is a snap-together connection.

9. The vehicle of claim 1, wherein the other item is a latch assembly.

10. The vehicle of claim 9, wherein the vehicle further includes a handle assembly housed in the interior door cavity as part of the locking system for the door, the handle assembly and the lock rod sharing a connection therebetween, with the handle assembly and the latch assembly together supporting the lock rod by opposing ends thereof for laterally orthogonal movement.

11. The vehicle of claim 1, wherein the attack member is a standalone structure fastened to the door as part of a disabling system for the lock rod.

12. The vehicle of claim 1, wherein the push member is a standalone structure fastened to at least one of the door and the impact beam as part of a disabling system for the lock rod.

13. A door for a vehicle, comprising:
an inner door panel and an outer door panel defining an interior door cavity therebetween;

a handle assembly, a latch assembly with a latch and a linkage with a lock rod housed in the interior door cavity as part of a locking system for the door, the handle assembly and the lock rod sharing a connection therebetween, and the lock rod and the latch assembly sharing a connection therebetween, with the handle assembly and the latch assembly together supporting the lock rod by opposing ends thereof for laterally orthogonal movement by which the linkage operates to actuate the latch;

an impact beam housed in the interior door cavity and crossing both an outboard push site and an inboard push site at the latch assembly from laterally between the latch assembly and the outer door panel;

an attack member housed in the interior door cavity, the attack member projecting into the interior door cavity from the inner door panel, and facing the lock rod from laterally between the inner door panel and the lock rod; and a push member housed in the interior door cavity along the impact beam, the push member projecting into the interior door cavity from the outer door panel around and laterally beyond the impact beam, and facing the latch assembly at the inboard push site from laterally between the latch assembly and the outer door panel; whereby when the door collapses when compromised by a side impact event, the inner door panel carries the attack member to apply attacking force to the lock rod, and the outer door panel carries the push member to apply counterpart pushing force to the latch assembly at the inboard push site in coordination with counterpart pushing force applied by the impact beam to the latch assembly at the outboard push site, to thus break the connection between the lock rod and the latch assembly.

14. The door of claim 13, wherein the outboard push site and the inboard push site laterally orthogonally flank the connection between the lock rod and the latch assembly.

15. The door of claim 13, wherein a closing distance between the impact beam and the outboard push site is substantially the same as a closing distance between the push member and the inboard push site, and when the door collapses when compromised by a side impact event, the outer door panel carries the push member to apply counterpart pushing force to the latch assembly at the inboard push site that initiates at substantially the same time as counterpart pushing force applied by the impact beam to the latch assembly at the outboard push site.

16. The door of claim 13, wherein the connection between the lock rod and the latch assembly is subject to snap-apart breaking, and with the attacking force applied by the attack member to the lock rod, and the counterpart pushing force applied to the latch assembly at the inboard push site by the push member in coordination with counterpart pushing force applied by the impact beam to the latch assembly at the outboard push site, the connection between the lock rod and the latch assembly thus snaps apart.

17. The door of claim 16, wherein the connection between the lock rod and the latch assembly is a snap-together connection.

18. The door of claim 13, wherein the attack member is a standalone structure fastened to at least one of the inner door panel and the impact beam as part of a disabling system for the lock rod.

19. The door of claim 13, wherein the push member is a standalone structure fastened to the outer door panel as part of a disabling system for the lock rod.

* * * * *

UNITED STATES PATENT AND TRADEMARK OFFICE
CERTIFICATE OF CORRECTION

PATENT NO. : 10,526,817 B2
APPLICATION NO. : 15/804447
DATED : January 7, 2020
INVENTOR(S) : Gray et al.

Page 1 of 1

It is certified that error appears in the above-identified patent and that said Letters Patent is hereby corrected as shown below:

In the Specification

Column 6, Line 37: replace "601" with --60I--
Column 6, Line 40: replace "601" with --60I--

Signed and Sealed this
Thirty-first Day of March, 2020

Andrei Iancu
*Director of the United States Patent and Trademark Office*